United States Patent
McRae

(10) Patent No.: US 9,433,891 B2
(45) Date of Patent: Sep. 6, 2016

(54) PERSONAL DEHUMIDIFICATION SYSTEM

(71) Applicant: Dennis McRae, Sharps Chapel, TN (US)

(72) Inventor: Dennis McRae, Sharps Chapel, TN (US)

(*) Notice: Subject to any disclaimer, the term of this patent is extended or adjusted under 35 U.S.C. 154(b) by 0 days.

(21) Appl. No.: 14/605,330

(22) Filed: Jan. 26, 2015

(65) Prior Publication Data
US 2015/0241071 A1 Aug. 27, 2015

Related U.S. Application Data

(60) Provisional application No. 61/944,142, filed on Feb. 25, 2014.

(51) Int. Cl.
| | |
|---|---|
| *B01D 53/02* | (2006.01) |
| *B01D 53/28* | (2006.01) |
| *B01D 53/26* | (2006.01) |
| *B01D 53/04* | (2006.01) |
| *F24F 3/14* | (2006.01) |

(52) U.S. Cl.
CPC ........... *B01D 53/28* (2013.01); *B01D 53/0438* (2013.01); *B01D 53/261* (2013.01); *F24F 3/1411* (2013.01); *B01D 2259/40096* (2013.01); *F24F 2003/144* (2013.01)

(58) Field of Classification Search
CPC B01D 2253/00; B01D 53/261; B01D 53/28; F24F 2003/144; F24F 2003/1458; F24F 3/1429
See application file for complete search history.

(56) References Cited

U.S. PATENT DOCUMENTS

| | | | |
|---|---|---|---|
| 7,975,331 B2 | 7/2011 | Flocard | |
| 8,402,580 B2 | 3/2013 | Walvius | |
| 2005/0044862 A1* | 3/2005 | Vetrovec | B01D 5/0066 62/93 |
| 2010/0107675 A1 | 5/2010 | Lifson | |
| 2011/0245790 A1 | 10/2011 | Castro | |
| 2012/0000207 A1 | 1/2012 | Parish | |
| 2013/0269522 A1 | 10/2013 | DeValve | |

* cited by examiner

*Primary Examiner* — Christopher P Jones
(74) *Attorney, Agent, or Firm* — Daniel Boudwin; Global Intellectual Property Agency

(57) ABSTRACT

A reusable, personal dehumidification system is provided that is utilized to remove moisture from the air within personal environments such that a user can remain dry. The system comprises a personal dehumidification device comprises a plurality of attached and foldable casings that support reusable moisture absorbing material therein. The personal dehumidification device is placed within a personal environment such that dry air is maintained therein to lessen a user's body perspiration while sleeping or the like. The personal dehumidification system further comprises a recharging unit, which is an insulated housing having a moisture wick material therein and an electrical heating element for releasing moisture from the personal dehumidification device when enclosed therein. The moisture is released from the device, whereafter the device can be reused within another personal environment to remove moisture therefrom.

10 Claims, 4 Drawing Sheets

PERSONAL DEHUMIDIFICATION SYSTEM

CROSS REFERENCE TO RELATED APPLICATION

This application claims the benefit of U.S. Provisional Application No. 61/944,142 filed on Feb. 25, 2014, entitled "Personal Dehumidification System." The above identified patent application is herein incorporated by reference in its entirety to provide continuity of disclosure.

BACKGROUND OF THE INVENTION

1. Field of the Invention

The present invention relates to moisture removing devices and dehumidifying structures. More specifically, the present invention relates to a moisture absorbing device and a moisture removing case that can be used to reset the device for subsequent use.

On average each person perspires upwards of four cups of water every day. When a person sleeps they perspire on average one to two cups of water. To reduce perspiration and to eliminate saturating clothing or bedding, it is critical to maintain dry air in and around the personal environment of the perspiring user. A dry ambient environment is the most critical factor to reducing body perspiration. Removing moisture from personal environments is a market that is underdeveloped. The need for personal dehumidification is present when the air in an enclosed personal environment needs to be removed of excessive moisture such that the air therein can be made more comfortable for the user, thereby creating a drier atmosphere to reduce the user's body perspiration. Personal environments of interest include enclosed areas under bedding material, volumes within sleeping bags, and any other personal enclosure in which an interior volume is substantially enclosed and the user is encased in a material layer.

Sleep is obviously one of the most critical components of everyone's life. Trying to get a better night sleep is something most desire. Surveys show one of the biggest factors contributing to poor sleep is night sweats. According to the International Hyperhidrosis Society, a recent study of 2,267 people showed 41% of the studied population experience night sweats. Night sweats occur as a result of a number of conditions, including menopause, prescription induced side effects (antidepressants being the largest contributor), stress, and illness and disease.

Those who suffer from night sweats often make the night sweat worse by pulling more covers over themselves because they feel cold as a result of evaporative cooling from the perspiration. The natural reaction is to apply more blankets to maintain a comfortable body temperature. However, this reaction traps humidity under the blankets and exacerbates the problem. The perspiration becomes greater and the user quickly becomes saturated and uncomfortable, as the moisture cannot escape the bedding material and is trapped therein. This same cycle and result is often found with those utilizing sleeping bags. Sleeping bags are generally used in colder environments, so sweating creates even greater discomfort to the person.

Some products exist on the market to reduce night sweating. These devices range from moisture wicking clothing and blankets, to fans that push ambient air into a personal enclosure. The drawback of these devices is they have not addressed the root cause of perspiration within a small personal enclosure, which is maintaining a dry internal environment about the individual within the small personal environment such that perspiration can be naturally dissipated from the person.

All users will perspire to some degree while sleeping, and will do so more in a personal enclosure such as a blanket or sleeping bag. The key aspect to maintaining a dry personal enclosure is removal of humidity from the air within the enclosure and around the user (i.e. the air within the personal environment). Removing moisture from the air such that it is as dry as possible will reduce the perspiration level of individual, remove moisture developed moisture, and eliminate an otherwise saturated interior while sleeping. Maintaining the air within a personal enclosure naturally removes perspiration from the user.

The present invention overcomes the aforementioned limitations in the art by providing for a personal dehumidification system that is configured to provide a personal dehumidifying device for a personal environment, and furthermore provide a means of resetting and reusing the device thereafter. Specifically, the device comprises a structure supporting reusable moisture absorbing material, which is configured to remove moisture from personal environments such that an individual's perspiration can be dissipated within the personal environment. Small personal environments include those enclosures in which a user resides for a period of time for rest, including blanket covered environments, bedding enclosures, and sleeping bags.

After a period of use, the device is placed within a recharging unit, which comprises an enclosure that removes moisture from the personal dehumidifying device such that it can be re-used to once again absorb moisture in the personal environment. The present invention addresses perspiration within a personal environment by reducing the humidity of the air within the user's small personal environment, resulting in less perspiration accumulating on the user's body. The device can thereafter be treated and reused after moisture is released from the device in the recharging unit. The recharging unit is an electrically powered heating compartment that releases collected moisture from the device such that the device can be thereafter be removed and reused.

2. Description of the Prior Art

Devices have been disclosed in the prior art that relate to condensation management devices and systems for removing moisture from enclosed environments. These include devices that have been patented and published in patent application publications. These devices generally relate to mattress pads and cushions, or to forced air systems for removing moisturized air. The present invention relates to a reusable moisture absorbing device and system, whereby the device is deployed within an enclosed sleeping environment to absorb moisture, and thereafter conditioned by the system for reuse. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Patent Publication No. 2012/0000207 to Parish, which discloses a condensation management system for use while sleeping that comprises a mattress pad distribution layer that distributes cooled or warmed air through channels therein. The air is pushed, pulled, or recirculated by an attached air conditioning control system that is coupled to the mattress pad and adjacent to the bed. The Parish device works by air movement within a personal environment and is well adapted for use at home. However, the Parish device fails to contemplate a device that absorbs moisture and can be used independently of a power source when deployed. The present invention uses power merely to recharge the personal dehumidifying device after a period of use.

Similar to Parish is U.S. Pat. No. 7,975,331 to Flocard, which comprises a cushion for a mattress that includes an air injection port and an air supply device forcing air through the device and away from a user resting thereon. The cushion allows moisture from the user to permeate through the upper layer and be drawn away by the air movement within the device. While providing a unique method of evaporative cooling and for removing moisture from a user, the device similarly requires a continual powers source and an air supply device. The present invention is a passive personal dehumidifying device that is temporarily used, recharged using a powered dehumidifier, and then reused within an enclosed environment.

U.S. Patent Publication No. 2011/0245790 to Castro discloses a night sweat pad that is configured to wick sweat away from a sleeping user. The device comprises a moisture absorbent filler sandwiched between an upper moisture permeable layer and a bottom cloth sheet. The pad forms a pillow and a surface upon which the user rests upon. In contrast, the present invention comprises a moisture absorbing device that is placed within an enclosure, whereby the device is not required to be contact with the user. The device absorbs moisture from the environment, drawing it inward and trapping it within its interior. The Castro device is a wicking device that requires contact with the user. Moreover, the present invention contemplates a recharging unit that can dry the personal dehumidifying device of the present invention after each use.

The present invention is a personal dehumidification system that comprises a dehumidification device and a recharging unit for the device, whereby the device is employed within enclosed sleeping environments or the like to remove moisture therefrom. The dehumidification device comprises a connected arrangement of desiccant casings, whereby reusable desiccant material is supported within the interior of each of the casings. The recharging unit is a housing having an electric heating element, an insulated construction, and a layer of moisture wicking material to prevent moisture from being re-absorbed by the device as it is being recharged therein. Moisture is removed from the moisture absorbing material and moisture is released therefrom for redeployment. In this way, the system provides a means to remove moisture from enclosed environments and reuse the device thereafter.

It is submitted that the present invention substantially diverges in design elements from the prior art, and consequently it is clear that there is a need in the art for an improvement to existing moisture removal systems. In this regard the instant invention substantially fulfills these needs.

SUMMARY OF THE INVENTION

In view of the foregoing disadvantages inherent in the known types of moisture removal systems now present in the prior art, the present invention provides a new system wherein the same can be utilized for removing moisture from an enclosed environment using a device that can be recharged and reused thereafter.

It is therefore an object of the present invention to provide a new and improved moisture removal system that has all of the advantages of the prior art and none of the disadvantages.

It is another object of the present invention to provide a moisture removal system to provide a personal dehumidification device comprises a plurality of attached and collapsible moisture absorbing casings, whereby moisture is absorbed through the casings and retained by the moisture absorbing material therein.

Another object of the present invention is to provide a moisture removal system with a personal dehumidification device that employs a moisture absorbent material that can absorb moisture and subsequently release moisture when heated within a recharging unit.

Yet another object of the present invention is to provide a moisture removal system with a personal dehumidification device that can collapse into a stowed state suitable for placement within a recharging unit compartment.

Another object of the present invention is to provide a moisture removal system with a recharging unit comprising an insulated housing configured to receive the stowed dehumidification device, and furthermore supporting an electrical heating element and a moisture wicking material along at least one inner wall.

Another object of the present invention is to provide a moisture removal system with a personal dehumidification device that is suitable for placement within a sleeping environment, such as under bed covers or within a sleeping bag to remove moisture from the air trapped therein, and thereby reduce the propensity of a sleeping user to perspire while sleeping therein.

Another object of the present invention is to provide a moisture removal system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
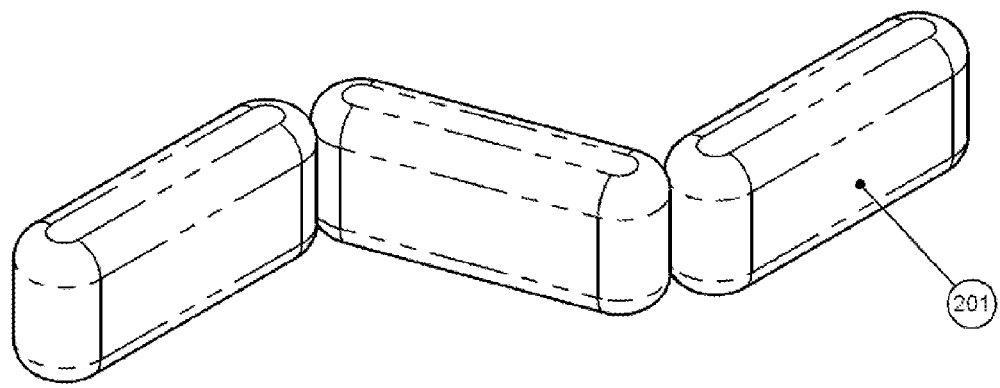
FIG. 1A shows a perspective view of the personal dehumidification device of the present invention.

Reference is made herein to the attached drawings. Like reference numerals are used throughout the drawings to depict like or similar elements of the moisture removal system of the present invention. For the purposes of presenting a brief and clear description of the present invention, the preferred embodiment will be discussed as used for maintaining dry air and removing moisture from an enclosed, personal environment. The figures are intended for representative purposes only and should not be considered to be limiting in any respect.

Figure 1B:
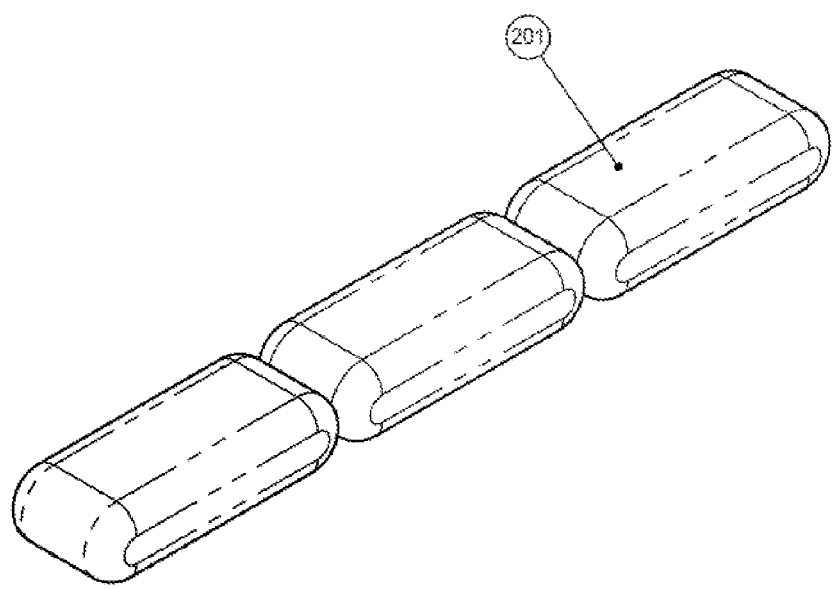
FIG. 1B shows another view of the personal dehumidification device of the present invention.

Referring now to FIGS. 1A and 1B, there are shown views of the personal dehumidification device 201 of the present invention. The personal dehumidification device 201 comprises one or more enclosed casings that support moisture absorbing material therein. The casings are elongated members having a moisture permeable sidewall and an enclosed interior volume. Within the interior volume is preferably a reusable moisture absorbing material such as clay, silica gel, or aluminum oxide desiccants, which absorbs moisture through the sidewalls of the casing and can be reheated to release the moisture stored therein after use.

In a preferred configuration, two or more casings are provided in connection with one another along the ends thereof. The casings comprise elongated, substantially rectangular structures with rounded ends. Two adjacent rounded ends connect to one another to secure adjacent casings, thereby connecting the casings together while also permitting the casing to pivot relative to one another. As shown in FIGS. 1A and 1B, the casings can pivot relative to one another or be aligned in a straight line. This allows the personal dehumidification device 201 to accommodate a personal enclosure and form to its shape. This also allows the personal dehumidification device 201 to be folded into a stacked configuration prior to being treated by a recharging unit (see FIGS. 4-6).

Figure 2:
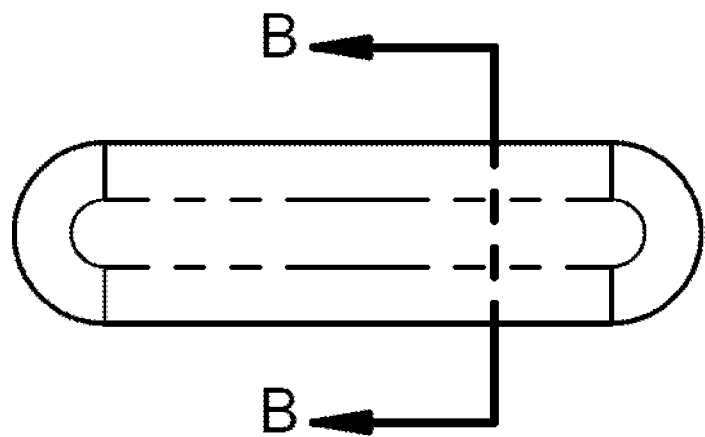
FIG. 2 shows an end view of the personal dehumidification device of the present invention.
Figure 3:
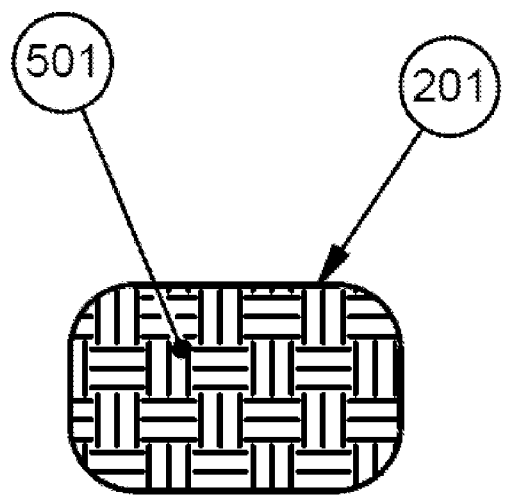
FIG. 3 shows a cross section view of the personal dehumidification device of the present invention.

Referring to FIGS. 2 and 3, there is shown an end view and a cross section view of the personal dehumidification device 201 of the present invention. The personal dehumidification device 201 comprises a casing with a substantially rectangular cross section with rounded ends and an interior volume. The moisture absorbing material 501 fills the interior volume of the device 201, whereby the material 501 absorbs moisture through the sidewalls of the device 201 when deployed in a humid or damp environment. The casing of the device 201 may take on different designs, falling within the scope of supporting moisture absorbing material therein, providing air permeable sidewalls, and allowing for adjacently attached casings to be connected thereto. It is not desired to limit the design or shape of the casing to one specific structure, but rather it is desired to disclose an embodiment that exemplifies the functional aspects of the claimed invention.

Figure 4:
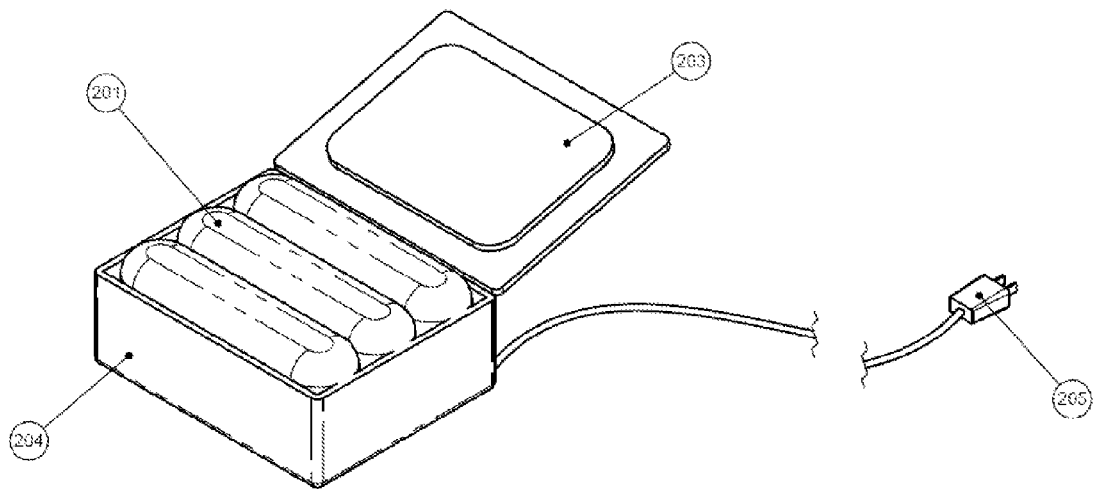
FIG. 4 shows a view of the personal dehumidification system of the present invention, including the dehumidification device and the recharging unit.

Referring now to FIG. 4, there is shown a perspective view of the personal dehumidification system of the present invention, including the personal dehumidification device 201 and the recharging unit 204. The recharging unit 204 is a housing having a preferably rectangular structure, an open upper, and a closable lid. The housing is insulated and sized to receive the personal dehumidification device 201 therein when the device 201 is folded into a stowed state as shown. The recharging unit 204 is an electrically powered housing that heats the personal dehumidification device 201 therein and releases moisture therefrom after each use.

Figure 5:
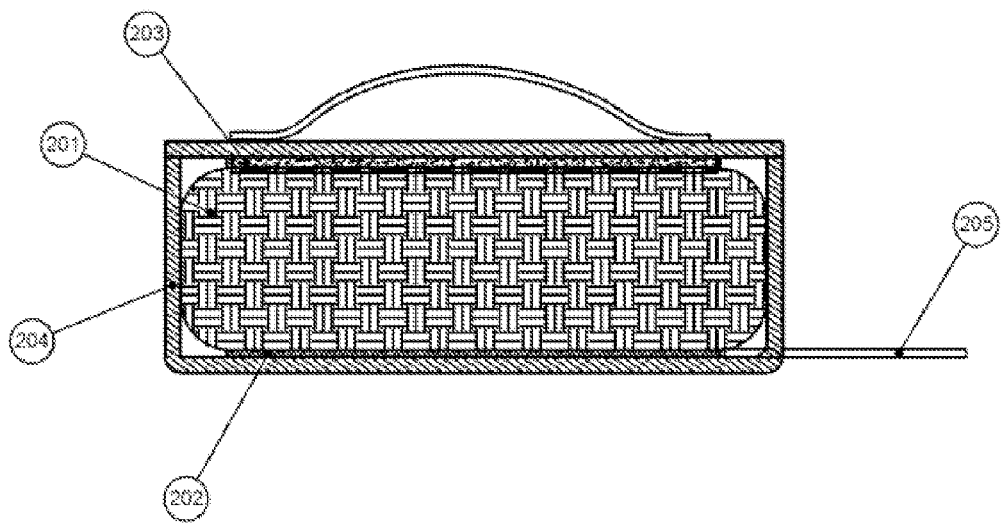
FIG. 5 shows a cross section view of the personal dehumidification system of the present invention, whereby the dehumidification device is positioned within the recharging unit.

Referring to FIGS. 4 and 5, the elements of the recharging system are shown. Along the base of the housing is an electrical heating element 202 that receives electrical current from an electrical cord 205 connected to an appropriate electrical outlet or power supply. The heating element 202 is preferably a resistive heating element that resists current flow and transforms the resistance into heat. The heat from the element 202 warms the personal dehumidification device 201 thereby releasing the stored water vapor in the moisture absorbing material 501. Along the interior surface of the housing lid is moisture wicking or absorbing material 203, which prevents released moisture leaving the device 201 from being re-absorbed by the device 201. This in turn recharges the device 201, removing moisture therefrom and allowing the device 201 to be removed from the housing ready to be reused in a personal enclosure.

Figure 6:
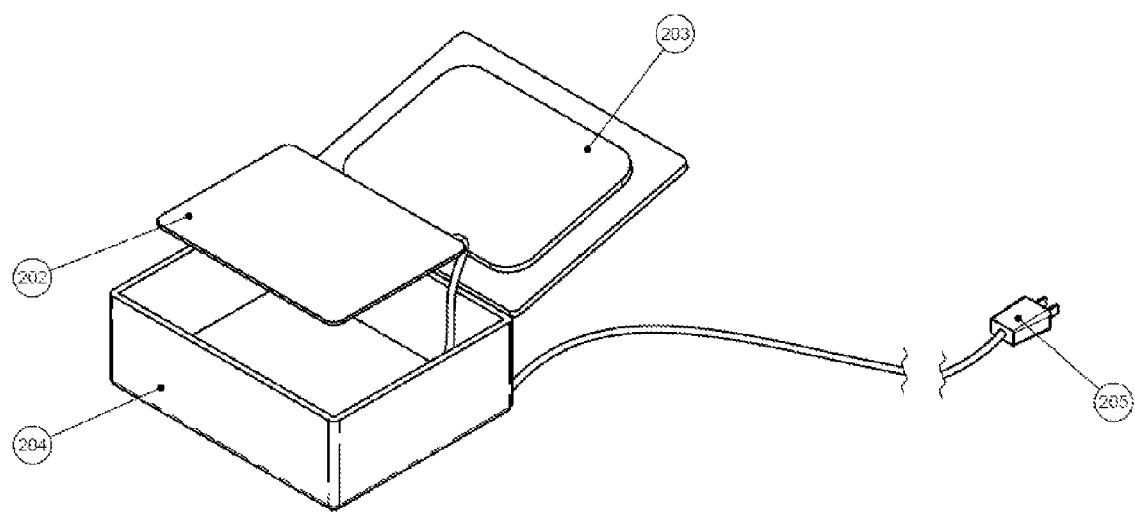
FIG. 6 shows a partially exploded view of the recharging unit of the present invention.

Referring to FIG. 6, there is shown a view of the recharging unit 204 in an exploded state, whereby the heating element 202 is visualized in connection with the electrical cord 205. The heating element 202 is preferably a resistive heating element, but may comprise other known and well understood electrical heating means in the art that can utilize electrical energy to heat the interior of the housing and release moisture from the personal dehumidification device placed therein. This releases moisture from the personal dehumidification device and allows the device to be redeployed in a personal environment, whereby the device removes moisture from the personal environment and can be reused in a repeated fashion without requiring disposal and replacement thereof.

The personal dehumidification system of the present invention used for the purposes of dehumidifying air within small personal environments such as bedding and sleeping bags, whereby the air can be made more comfortable for a sleeping user. The device creates drier air within the enclosed personal environment to reduce the user's body perspiration. Such personal environments include but are not limited to usage under bedding while covered, under blankets, within sleeping bags, or any other small personal enclosure the user wishes to position themselves in and use the device to reduce humidity therein.

The personal dehumidification system includes two functional components to achieve ongoing dehumidification for a small personal enclosure. These include the personal dehumidification device and the recharging unit. The personal dehumidification device removes water vapor from a personal environment, and the recharging unit removes water vapor from the moisture absorbing media (desiccant material) within the personal dehumidification device such that the device can be reused. When the personal dehumidification device requires recharging (release of water vapor), the personal dehumidification device is placed on the heating element within the recharging unit. The recharging unit has thermally insulated walls to provide thermal insulation while heating the personal dehumidification device. The moisture wicking or absorbing material in the recharging unit prevents released water from reentering the personal dehumidification device. The recharging unit is closed but is not air tight, allowing moist air to move out of the device during the heating process. A mechanical connector is provided to secure the lid to the housing that does not seal the interior volume and allows air to move in and out of the housing while recharging the personal dehumidification device. A power supply is connected to the power cord of the heating element, raising temperature of the heating element and the personal dehumidification device therein, which causes water vapor release. The heating element shuts off after a period of time, whereby the recharge cycle is complete.

Overall, the present invention dehumidifies the air within small personal environments such that the air therein can be made more comfortable for a user, thereby creating drier air to reduce the user's body perspiration. The personal dehumidification device provides a mechanism to remove the water vapor from the air (lower the humidity) so natural perspiration can occur. The effect of lowering the humidity in a personal enclosure results in reduced sweating and less discomfort and/or loss of sleep due to sweating. In addition, the personal dehumidification device is rechargeable (heated to release water vapor) via the recharging unit so it is a reusable device that provides an ongoing solution. Effective uses include under blankets while sleeping, under sleeping bags, and within any small enclosure the user would like to keep dry (e.g. under a boat tarp to reduce mildew). It should be understood that the present invention may be useful in both an AC and DC versions which may be accomplished using a DC to AC converter.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dehumidification system, comprising:
   a personal dehumidification device comprising a plurality of pivotally attached casings each supporting reusable moisture absorbing media therein;
   a recharging unit comprising a housing having an interior volume sized to receive and enclose said personal dehumidification device therein;
   said housing comprising an electrical heating element therein.

2. The dehumidification system of claim 1, wherein said electrical heating element further comprises an electric cord to electrically connect said electrical heating element to a power source.

3. The dehumidification system of claim 1, wherein said housing further comprises thermally insulated walls.

4. The dehumidification system of claim 1, wherein said moisture absorbing media further comprises a reusable desiccant material that can be dried and reused thereafter to absorb moisture.

5. The dehumidification system of claim 1, wherein said plurality of casings comprise air permeable sidewalls.

6. The dehumidification system of claim 1, wherein said housing further comprises a lid that can open and enclose said interior volume wherein said interior volume is not air tight.

7. The dehumidification system of claim 1, wherein:
   said electrical heating element further comprises an electric cord to electrically connect said electrical heating element to a power source;
   said power source comprising one of either an AC or DC power source.

8. The dehumidification system of claim 1, wherein said electrical heating element further comprises a switch that ceases operation of said electrical heating element after a period of time.

9. The dehumidification system of claim 1, wherein said electrical heating element further comprises a resistive heating element.

10. The dehumidification system of claim 1, further comprising a moisture absorbing material within said housing that absorbs moisture released from said personal dehumidification device.

* * * * *